United States Patent [19]

Thum

[11] Patent Number: 5,194,199

[45] Date of Patent: Mar. 16, 1993

[54] METHOD OF PRODUCING A BEAM-LIKE STRUCTURAL PART HAVING A CORE OF LIGHT-WEIGHT MATERIAL

[75] Inventor: Holger M. Thum, Brunswick, Fed. Rep. of Germany

[73] Assignee: Volkswagen AG, Wolfsburg, Fed. Rep. of Germany

[21] Appl. No.: 832,353

[22] Filed: Feb. 7, 1992

[30] Foreign Application Priority Data

Feb. 20, 1991 [DE] Fed. Rep. of Germany ....... 4105302

[51] Int. Cl.$^5$ ............................................. B29C 67/22
[52] U.S. Cl. .................... 264/46.6; 264/46.5; 264/46.7; 264/275
[58] Field of Search .............. 264/46.6, 275, 46.7, 264/46.9, 45.1, 278, 46.5; 427/434.2

[56] References Cited

U.S. PATENT DOCUMENTS

| | | | |
|---|---|---|---|
| 3,607,510 | 9/1971 | Serafino et al. | 156/188 |
| 3,810,337 | 5/1974 | Pollard | 264/46.7 |
| 4,075,264 | 2/1978 | Hay, II | 264/46.9 |
| 4,333,780 | 6/1982 | Allada | 264/54 |
| 4,381,908 | 5/1983 | Roth | 264/278 |
| 4,413,822 | 11/1983 | Fernandez et al. | 264/46.6 |
| 4,493,864 | 1/1985 | Thomson | 138/109 |
| 4,629,597 | 12/1986 | Charlebois et al. | 264/278 |
| 4,891,175 | 1/1990 | Haines | 264/278 |
| 4,898,630 | 2/1990 | Kitoh et al. | 264/55 |
| 4,902,458 | 2/1990 | Trimble | 264/46.6 |

FOREIGN PATENT DOCUMENTS

| | | | |
|---|---|---|---|
| 0247239 | 12/1987 | European Pat. Off. | |
| 2222557 | 11/1973 | Fed. Rep. of Germany | |
| 2747721 | 4/1979 | Fed. Rep. of Germany | |
| 2217149 | 9/1974 | France | 264/46.9 |
| 51-060258 | 5/1976 | Japan | 264/46.9 |

Primary Examiner—Allan R. Kuhns
Attorney, Agent, or Firm—Brumbaugh, Graves, Donohue & Raymond

[57] ABSTRACT

A structural part, such as a kinetic energy-absorbing beam for vehicle construction, formed of a hollow metal member produced from profiled members connected by application of heat and a prefabricated reinforcing core of light-weight material is produced by first providing the core with a shell of heat-foamable material, then completing the hollow member by welding, and finally subjecting the assembly to an immersion-coating operation with heat. The hollow member has local inward projections for positioning of the core, leaving open spaces which provide thermal insulation during the welding process and which are permeated by hot coating material during the immersion-coating, so that the shell is foamed and a positive, force-transmitting connection is provided between the core and the hollow member.

2 Claims, 1 Drawing Sheet

METHOD OF PRODUCING A BEAM-LIKE STRUCTURAL PART HAVING A CORE OF LIGHT-WEIGHT MATERIAL

BACKGROUND OF THE INVENTION

This invention relates to a method for producing a beam-like structural part with a light-weight core.

In the construction of a motor vehicle, which is the preferred use of the present invention, it is desirable to provide a light-weight structural beam that will absorb kinetic energy upon impact, consisting of a hollow metal member made from two or more component sections, for example, a channel and a cover plate, welded together. German Offenlegungsschrift No. 2 222 557 discloses the use of a light-weight core in the form of a foamed member to be placed in a hollow metal member after foaming in order to achieve a controlled absorption of kinetic energy by accordion buckling. That reference does not disclose, however, how the core of light material is connected to the hollow member so as to transmit force. Also, the method described therein is evidently limited to structural members having a shape which permits a prefabricated core of light structural material to be pushed into the hollow metal member from an open end, since the hollow member is apparently completed prior to insertion of the core. This is apparent because, if the hollow member were to be assembled by welding several component sections together only after insertion of the core of light-weight material, there would be a danger of damage to the core resulting from the heat applied during welding.

This difficulty is also present in the use of the method described in German Offenlegungsschrift No. 27 47 721, in which foam material is inserted into a plastic bag which was previously mounted in a hollow member and is intended to form adhesive bonds with the hollow member. In addition, this method is especially complicated where the hollow members have substantial length since, in that case, additional measures such as inflation with compressed air are required to expand the bag for introduction of the foam material.

European Patent No. 0 247 239 describes a method of producing a coatable light-weight structural part, in particular for vehicles, in which a metal sheet is first coated with a cross-linked layer of a polyester, epoxide or polyurethane compound, after which the metal sheet is formed into the desired shape. Layers of fiber mat impregnated with thermoplastic Duroplast preproduct are then inserted and the inserted layers are pressed in the formed sheet-metal part and heated to convert them into a hardened material. Since the layer coated on the metal sheet has good adhesion to both the sheet-metal and the impregnated fiber mats, good adhesion of the layers to the sheet-metal part is assured. In this disclosure, however, no consideration is given to the difficulties that can arise when a hollow member must be assembled from several component sections by operations such as welding which require application of heat.

SUMMARY OF THE INVENTION

Accordingly, it is an object of the present invention to provide a method for producing a structural beam having a core of light-weight material which overcomes the above-mentioned disadvantages of the prior art.

Another object of the invention is to provide such a method whereby a hollow beam having a core of light-weight material which enhances flexural rigidity and/or accordion buckling stress in a "crash" is produced by welding and in which damage to the core is avoided during welding of the hollow beam and wherein a load-transmitting connection between the core of light-weight material and the hollow beam is produced without additional production steps.

These and other objects of the invention are attained by inserting a core of light-weight material having a shell of heat-expandable material into a hollow member so as to provide heat-insulating spaces between the shell and the hollow member and immersion-coating the assembled core and hollow member with heat, causing the shell material to be expanded and fill the spaces.

In a preferred embodiment, the core of light-weight material, which may be a hard polyurethane or aluminum foam, is first provided with a shell of a material which is foamable by heating popcorn-effect and is then placed in an open hollow member such as a channel. By suitable conformation of the core and/or the hollow member, the core is positioned in the hollow member only by local projections or the like. Consequently, heat transfer to the core during the welding operation required to complete the hollow member is minimal so that the core material is not damaged. Furthermore, the open spaces separating the core and the hollow member between the positioning projections permit hot coating compound to reach the shell of the core as well as the surface of the hollow member during immersion to cause foaming of the shell and produce positive stressed connections between the core and the hollow member. Since immersion-coating is in any event required for corrosion protection of the hollow member, the foaming of the shell material thus requires no additional step or further application of energy.

Various materials may be used for the shell. A suitable starting material is a mixture of capsules containing different components of a polyurethane material which, when mixed, will foam and harden upon application of heat. The capsule walls consist of a material which will melt or deform upon heating. Expandable wall material is also suitable.

BRIEF DESCRIPTION OF THE DRAWINGS

Further objects and advantages of the invention will be apparent upon a reading of the following description in conjunction with the accompanying drawings, in which.

DESCRIPTION OF PREFERRED EMBODIMENT

Figure 1:
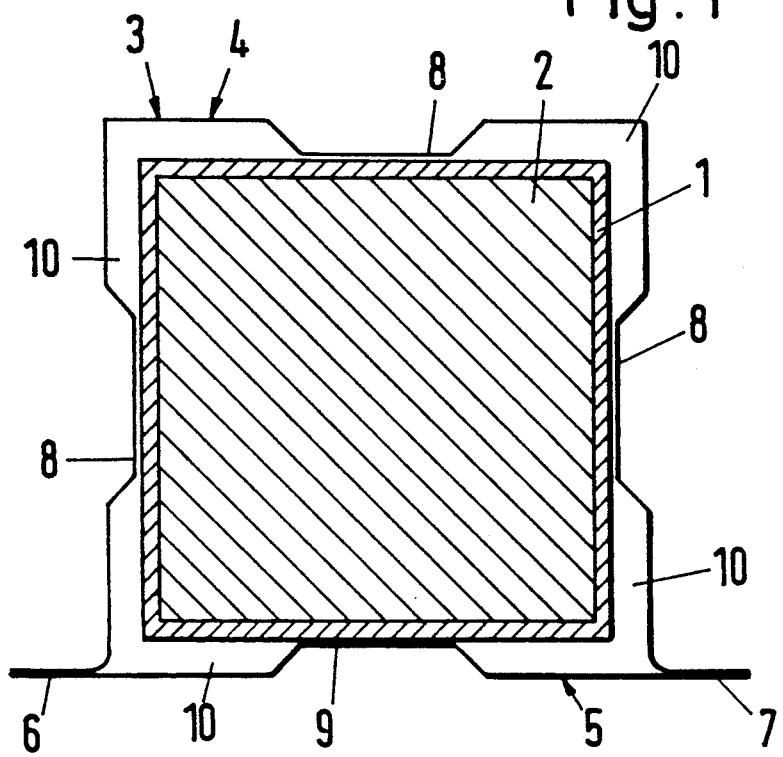
FIG. 1 is a cross-sectional view of a representative embodiment of the invention intended for use as a longitudinal structural member in a vehicle for absorbing kinetic energy by accordion-buckling deformation in the event of a crash, shown prior to expansion of the core shell.

In the typical embodiment of the invention shown in FIG. 1, a core of light-weight material 2 provided with a foamable shell 1 is placed in a hollow member 3 as one step in the manufacture of a structural member. In this case, the member 3 is made from steel and is assembled from a channel 4 and a cover plate 5 by welding two adjacent flange portions 6 and 7 after the core 2 has been inserted. In portions of the member 3 which are remote from the flange portions 6 and 7 and hence from the welds, the two component sections 4 and 5 are provided with inwardly-directed projections 8 and 9, respectively, arranged to position the core 2 centrally in the hollow member before the material of the shell 1 is foamed. Because these projections provide only local points of contact between the hollow member 3 and the shell 1 which are remote from the welds and hence from the places where heat is applied during welding, the material of the shell 1 and also that of the light-weight core 2 will not be affected by the welding operation which completes the hollow member 3. Moreover, open spaces 10 separating the core and the inside wall of the hollow member 3 as a result of the projections 8 and 9 provide heat insulation for the core.

Figure 2:
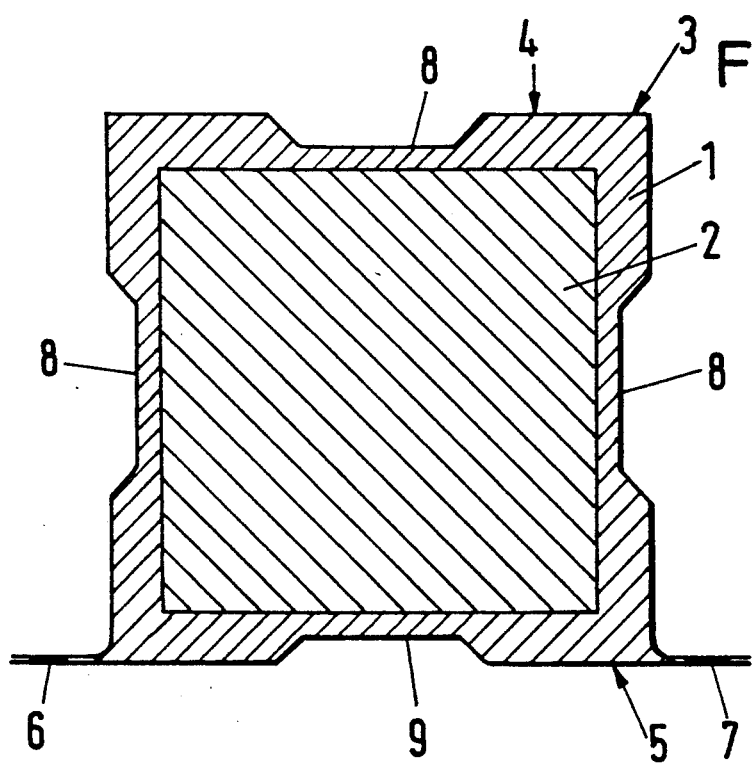
FIG. 2 is a view similar to FIG. 1 showing the structural member after expansion of the core shell.

After welding of the flange regions 6 and 7, the assembly, which has the configuration shown in FIG. 1, is subjected to an immersion-coating in which a hot coating compound for the member 3 penetrates into the space 10 and transmits heat to the material of the shell 1 of the core. That causes the shell material to foam so that the shell 1 fills the spaces 10, as shown in FIG. 2. A thinner layer of the shell material is also present between the core 2 and the projections 8 and 9 in the hollow member 3.

The invention thus provides a method which, by a simple arrangement, avoids damage to the light-weight core upon assembly of the hollow member, which may consequently be produced in as complicated a form as required, and ensures a positive stressed connection between the core and the hollow member.

Although the invention has been described herein with reference to a specific embodiment, many modifications and variations therein will readily occur to those skilled in the art. Accordingly, all such variations and modifications are included within the intended scope of the invention.

I claim:

1. A method for producing a longitudinal beam containing a reinforcing core of light-weight material and a hollow metal member consisting of profiled members engaging portions projecting away from the core and forming a longitudinally extending joint connected by application of heat comprising inserting in the hollow member a core of lightweight material having a shell of material which is expandable by heating, providing local projections extending between the core and the hollow member to produce open spaces between them, completing the hollow member by applying heat to said engaging portions projecting away from the core to form said longitudinally extending joint during which the open spaces provide thermal insulation for the core, and immersion-coating the longitudinal beam with heating to produce foaming of the shell material so as to fill the open spaces.

2. A method for producing a longitudinal beam containing a reinforcing core of light-weight material and a hollow metal member consisting of profiled members having engaging portions projecting away from the core which are connected by application of heat comprising inserting in the hollow member a core of light-weight material having a shell of material which is expandable by heating, providing local projections extending between the core and the hollow member to produce open spaces between them, completing the hollow member by applying heat to the engaging portions of the profiled members to connect the profiled members during which the open spaces provide thermal insulation for the core, and immersion-coating the longitudinal beam with heating to produce foaming of the shell material so as to fill the open spaces.

* * * * *